(# 3,071,505)

INSECTICIDAL DIESTERS OF DITHIOSULFUROUS ACID

William F. Wolff, Park Forest, Ill., assignor to Standard Oil Company, Chicago, Ill., a corporation of Indiana
No Drawing. Original application Mar. 31, 1958, Ser. No. 724,798, now Patent No. 3,015,670, dated Jan. 2, 1962. Divided and this application Feb. 16, 1961, Ser. No. 89,621
8 Claims. (Cl. 167—22)

This invention relates to organic diesters of dithiosulfurous acid as novel compounds, and also to the method of preparation of such compounds and uses therefor.

An object of the present invention is to provide certain novel esters of sulfurous acid. Another object is to provide a method for preparing the novel organic diesters of dithiosulfurous acid. A further object is to provide a method for preparing organic diesters of dithiosulfuric acid. An additional object is to provide novel pesticidal compositions and methods for killing insects without harmful effect to vegetation. These and other objects will be more fully apparent from the description of the invention.

It has been found that diesters of dithiosulfurous acid corresponding to the formula

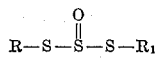

wherein R and $R_1$ are the same or different hydrocarbon radicals can be prepared by reacting a mercaptan with thionyl chloride in the presence of a soluble organic base. Basic amines, preferably tertiary amines, function very effectively as the soluble organic base employed in the reaction. The reaction is advantageously carried out while using a hydrocarbon solvent for the reactants and the base. The diester of dithiosulfurous acid can be converted to the corresponding diester of dithiosulfuric acid by contacting with free oxygen. Diesters of dithiosulfurous acid such as di-tertiary butyl dithiosulfite are highly toxic to insects and may be used for pesticidal purposes. They are very advantageous for use since they display no phytotoxic effect causing harm to vegetation. A dilute solution of the dithiosulfurous acid diester in a suitable solvent such as a petroleum oil may be used as the pesticidal composition.

The diesters of dithiosulfurous acid are obtained by reacting a mercaptan with thionyl chloride. The reaction is believed to proceed in the following manner:

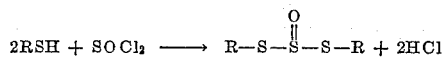

Individual mercaptans or mixtures of mercaptans may be employed in the reaction. When a single mercaptan is employed, both R groups in the diester of dithiosulfurous acid will be the same. When a mixture of mercaptans is used, some of the diesters will have different hydrocarbon radicals attached to the sulfur atoms. These hydrocarbon radicals attached to the sulfur atoms may be alkyl, alkenyl, alkadienyl, cycloalkyl, alkylcycloalkyl, cycloalkenyl, aryl, alkaryl, aralkyl, etc. The hydrocarbon radical many have from 1 to 20 carbon atoms or even more. Examples of mercaptans which may be used in the synthesis are dodecyl mercaptan, either tertiary- or normal-, tertiary octyl mercaptan, tertiary hexyl mercaptan, tertiary butyl mercaptan, propyl mercaptan, ethyl mercaptan, thiophenol, thiocresol, thionaphthol, cyclohexyl mercaptan.

The reaction between the mercaptan and thionyl chloride is quite vigorous and almost instantaneous. It is not necessary to use heat in carrying out the reaction since it proceeds at room or atmospheric temperatures. If desired, however, temperatures of 50° C. and higher may be used, and temperatures as low as −20 to −40° C. may be employed. For ease of product work-up, it is preferred to employ the mercaptan and thionyl chloride in approximately the stoichiometric ratio of two mols of mercaptan per mol of thionyl chloride. Use of thionyl chloride in large excess of the stoichiometric ratio may result in incomplete reaction, formation of the monoester rather than the diester, and the formation of impurities and by-products. It is preferred to use an excess of the mercaptans rather than an excess of the thionyl chloride, the excess being with respect to the stoichiometric ratio, in carrying out the reaction.

The reaction is carried out in the presence of an organic base which is soluble or solubilized in the reactants. Basic organic nitrogen compounds may suitably be used for this purpose, although other basic organic compounds may likewise be employed. Heterocyclic and tertiary amines are outsanding for use in the process. Examples of preferred organic bases are heterocyclic amines such as pyridine, picoline, pyrroles, quinoline, tertiary amines such as tributyl amine, etc. It is believed that the organic base reacts with the evolved hydrogen chloride produced in the reaction and thereby prevents hydrogen chloride from catalyzing rearrangement of the diester of dithiosulfurous acid to sulfides or disulfides and prevents cleavage of the diester. It is desirable to employ the organic base in an amount sufficient to react with all of the hydrogen chloride to be evolved in the reaction. Thus the organic base should be used in the amount of at least two mols per mol of thionyl chloride employed in the reaction. Amounts in excess of this are preferable.

The reaction may be carried out by adding either of the reactants one to the other in the presence of the organic base. Improved yields of the diesters of dithiosulfurous acid are obtained by employing a solvent for the reactants. The solvent should be one in which the organic base is also soluble. Hydrocarbon solvents have been found to be preferable to solvents such as ethyl ether, although ethers are quite useful. For example, hydrocarbon solvents such as pentanes, hexanes, octanes, petroleum fractions purified of sulfur compounds or other impurities which might enter into the reaction, and the like may be used. As the reaction proceeds, a precipitate of the hydrogen chloride salt of the organic base forms. When no further amounts of precipitate are formed, the reaction is about complete. The precipitate is removed from the liquid reaction products, solvent and any excess mercaptan are removed from the remaining liquid by distillation or other suitable techniques. This remaining liquid may thereafter be washed or otherwise purified to provide the diester of dithiosulfurous acid in rather pure form.

The diester of dithiosulfurous acid may be converted to the corresponding diester of dithiosulfuric acid by contacting the crude reaction products containing the dithiosulfurous ester with free oxygen. Similarly, the purified diester of dithiosulfurous acid may be treated with free oxygen to convert it to the corresponding dithiosulfuric ester. If the dithiosulfurous ester is merely exposed to the air, it will gradually be converted to the dithiosulfuric ester. Consequently, air should be excluded from contact with the diester of dithiosulfurous acid when the latter compound is desired in a state free of the corresponding dithiosulfuric ester. Attempts to prepare the diester of dithiosulfuric acid by reacting two mols of a mercaptan with sulfuryl chloride have been unsuccessful, whereas treatment of the diester of dithiosulfurous acid with free oxygen readily forms the dithiosulfuric acid diester.

When using mercaptans other than tertiary mercaptans, it has been found necessary to employ the organic base in the reaction zone in order for the reaction between the mercaptan and thionyl chloride to proceed and form the diester of dithiosulfurous acid. When using tertiary mercaptans such as tertiary butyl mercaptan, tertiary hexyl mercaptan, tertiary octyl mercaptan, tertiary octenyl mercaptan, tertiary dodecyl mercaptan and the like, the reaction to form diesters of dithiosulfurous acid proceeds in the absence of the organic base but the presence of the base improves the yields of the diester. It has also been found that the higher molecular weight tertiary mercaptans, such as tertiary octyl mercaptan and higher, react more readily with the thionyl chloride to form the diesters of dithiosulfurous acid than do the lower molecular weight tertiary mercaptans such as tertiary butyl mercaptan. However, with the other mercaptans such as primary mercaptans, secondary mercaptans, aromatic mercaptans, it is essential to employ the organic base in the reaction zone in order to produce the diesters of dithiosulfurous acid.

A number of examples were carried out which illustrate various aspects of the invention.

*Example 1*

Pyridine in the amount of 6 grams and 6 grams of freshly distilled tertiary butyl mercaptan were dissolved in n-pentane and the resultant solution was slowly poured, with manual agitation, into a solution of 2.4 grams thionyl chloride in n-pentane. The reaction was carried out at room temperature. Reaction with the formation of much precipitate occurred immediately. The mixture was then filtered to obtain 65 cc. of filtrate. 20 cc. of the filtrate were evaporated under a pressure of less than 1 mm. Hg abs. After the evaporation step, about 1.1 grams of clear liquid were withdrawn from the remaining non-evaporated liquid. This clear liquid was briefly blown with air and set to a solid. A portion of this solid was briefly contacted with boiling water, allowed to recrystallize, and then filtered free of water, after which treatment it was found to have a melting point of 46–50° C. Further portions of the solid were then analyzed by infra-red spectrum analyses which showed the presence of the following groups:

$(CH_3)_3C-$, $(CH_3)_3C-S-$, $S-S$, and $\overset{|}{\underset{|}{S}}=O$

The sulfoxide band, which was the strongest present, appeared at 1110 cm.$^{-1}$. Infra-red spectrum of the product also showed a medium intensity band at 1160 cm.$^{-1}$, indicating the presence of a sulfone grouping which was formed by the air oxidation of the diester of dithiosulfurous acid to the diester of dithiosulfuric acid. Additional analyses showed a sulfur content of 42.0 weight percent (as compared with a theoretical weight percent of 42.5%) and a molecular weight of 234±10 (theoretical is 226). The product thus contained

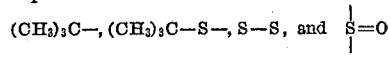

together with a small amount of the corresponding dithiosulfate diester.

*Example 2*

1.2 grams of thionyl chloride in 15 cc. ethyl ether were slowly added with manual agitation to a solution of 3.0 grams pyridine and 3.0 grams tertiary butyl mercaptan in 25 cc. ethyl ether. The reaction proceeded rapidly at room temperature, as evidenced by the formation of a precipitate. When the formation of no additional amounts of precipitate were observed, the product mixture was filtered to separate the precipitate, and the filtrate was evaporated to obtain di-tertiary butyl dithiosulfite as a white solid melting at 44–49° C. A portion of this material was recrystallized from n-pentane at Dry Ice temperatures and the recrystallized di-tertiary butyl dithiosulfate was found to have a melting point of 46–52° C.

*Example 3*

A solution of 6.0 grams pyridine and 4.0 grams ethyl mercaptan in 40 cc. n-pentane was slowly added, with manual agitation, to a solution of 2.4 grams thionyl chloride in 30 cc. n-pentane. The reaction was started out at room temperature, and some heat was evolved as pyridine hydrochloride precipitate formed. After about 15 minutes most of the liquid was decanted from the precipitate. The liquid was washed twice with water. A portion of the washed liquid was evaporated under a stream of nitrogen. The remaining non-evaporated liquid, which was a pale yellow-green in color, contained diethyl dithiosulfite,

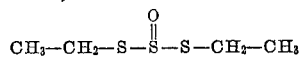

as evidenced by the infra-red bands for $-\overset{O}{\underset{\|}{S}}-$ in $-S-\overset{O}{\underset{\|}{S}}-S-$ and for the $-CH_2-S-$ linkages. This product failed to show a band for a sulfone linkage but developed the band after it was blown briefly with oxygen.

*Example 4*

In this example, diesters of dithiosulfurous acid were prepared from tertiary octyl mercaptan and tertiary butyl mercaptan. The same technique was employed in both syntheses. The diesters which were prepared were: di-tertiary octyl dithiosulfite having the formula

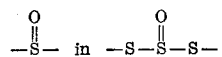

and di-tertiary butyl dithiosulfite whose structural formula was shown earlier. The procedure involved consisted of dissolving 27.7 grams of pyridine in 50 cc. of ether. A solution of tertiary octyl mercaptan in ether was made by dissolving 47.1 grams of tertiary octyl mercaptan in 50 cc. of ether. 20.8 cc. of the aforementioned tertiary octyl mercaptan solution were mixed with 15.4 cc. of the pyridine solution. A thionyl chloride solution was prepared by dissolving 57 grams of thionyl chloride in 150 cc. of ether. To the mixed pyridine and tertiary butyl mercaptan solutions, which were at room temperature, were added 12.1 cc. of the thionyl chloride solution. A rapid reaction occurred with the formation of a white solid precipitate. After stirring for two minutes, 25 cc. of water was added with stirring. A top oily layer was separated from the reaction products mixture. The oily layer was blown for about 15 minutes with high purity nitrogen and thereafter subjected to infra-red spectrum analysis. The presence of the 1110 cm.$^{-1}$ band characteristic of the di-thiosulfites was observed, indicating the presence of di-tertiary octyl dithiosulfite. The same procedure was employed in preparing the di-tertiary butyl dithiosulfite except that 17.2 cc. of tertiary butyl mercaptan solution (the tertiary butyl mercaptan solution was prepared by dissolving 29 grams of the mercaptan in 50 cc. of ether) were used in place of the tertiary octyl mercaptan solution. Infra-red analysis indicated the presence of di-tertiary butyl dithiosulfite in the reaction products.

*Example 5*

104 cc. of tertiary octyl mercaptan solution were prepared by dissolving 47.1 grams of tertiary octyl mercaptan in 50 cc. of ethyl ether. A thionyl chloride solution was prepared by dissolving 57 grams of thionyl chloride in 150 cc. of ethyl ether. To 20.8 cc. of the tertiary octyl mercaptan solution were added 12.1 cc. of the thionyl chloride solution, the reaction mixture was allowed to stand for about an hour, and the total product was then poured onto a large watch glass and blown with nitrogen for 10 minutes ot evaporate the ether. The remaining non-evaporated liquid contained di-tertiary octyl dithiosulfite as evidenced by infra-red analysis showing the presence of the 1110 cm.$^{-1}$ band characteristic of the diesters of dithiosulfurous acid.

When experiments as described in Example 5 were carried out using ethyl mercaptan and thiophenol, diesters of dithiosulfurous acid were not formed. Since Examples 3 and 7 show that the diesters of dithiosulfurous acid were formed when a soluble base was present in the reaction zone, it is evident that the tertiary alkyl mercaptans are peculiarly more reactive in the process and distinctive from the other mercaptans for purposes of producing the dithiosulfites.

*Example 6*

16.2 grams of n-dodecyl mercaptan plus 7.25 grams of pyridine were dissolved in 50 cc. n-pentane. A solution of 4.75 grams thionyl chloride in 25 cc. n-pentane was slowly added to the first solution at room temperature. A white precipitate formed and heat was evolved. The product was allowed to stand for 10 minutes and washed with 25 cc. and 50 cc. portions of water. Additional n-pentane was added and the pentane solution was evaporated under a rapid stream of nitrogen. The remaining non-evaporated product was then submitted to infra-red spectrum analysis which showed the presence of the 1110 cm.$^{-1}$ band characteristic of the dithiosulfites. Thus di-n-dodecyl dithiosulfite corresponding to the formula

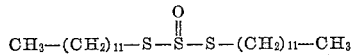

was formed.

*Example 7*

5.35 grams of pyridine and 5.1 grams of isopropyl mercaptan were dissolved in n-pentane. Into this solution was poured a thionyl chloride-pentane solution containing 3.5 grams of thionyl chloride. The mixture was agitated and then allowed to stand at room temperature. A white crystalline solid separated from the solid. Approximately a week later the solids were removed by filtration and washed with n-pentane. The solid had a melting point of 86–93° C., displayed infra-red absorption bands characteristic of a tetra-substituted pyridine, and had sulfur and nitrogen contents (39.7% and 3.19%, respectively) corresponding to a reaction product of one pyridine molecule with two molecules of di-iso-propyl dithiosulfite. After subjecting the remaining liquid reaction products (after removal of the white crystalline solid) to vacuum evaporation, the non-evaporated liquid displayed the infra-red absorption band characteristic of the dithiosulfite structure. Thus di-isopropyl dithiosulfite corresponding to the formula

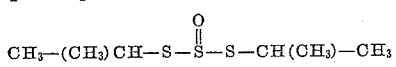

was present in the liquid reaction product.

*Example 8*

To a mixture of 4.05 grams of pyridine and 4.4 grams thiophenol in 50 ml. n-pentane was slowly added a solution of 2.4 grams thionyl chloride in 20 ml. n-pentane. After separating a precipitate from the reaction products, the remaining liquid was partially evaporated under vacuum. The non-evaporated portion formed a pasty solid which displayed the infra-red absorption band characteristic of the dithiosulfite structure. The product from the reaction therefore contained di-phenyl dithiosulfite having the formula

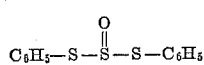

The pesticidal activity of the diesters of dithiosulfurous acid was demonstrated in a number of tests. A 0.2 weight percent concentration of di-tertiary butyl dithiosulfite in acetone was found to cause 82% kill of red spider mites which infested leaves. The solution was applied by spraying on an amount merely sufficient to wet the surface of the test leaves. 80% kill of southern army worms which infested the test leaves was obtained by spraying an 0.5 weight percent solution of di-tertiary butyl dithiosulfite in acetone solution on the leaves in an amount merely sufficient to wet the leaf surface. Dilute solutions of the di-tertiary butyl dithiosulfite in acetone were also found to be toxic to Mexican bean beetles and green peach aphids. The dithiosulfite displayed only a slight phytotoxicity toward the leaves, thus indicating that foliage damage would be inconsequential when used on a large scale. Rather than using an acetone carrier, a suitable insecticidal composition comprises from .001 to 1% of the diester of dithiosulfurous acid in a mineral oil which preferably has a low aromatics content.

Besides their use as insecticides and for other pesticidal purposes, the diesters of dithiosulfurous acid are useful as oxygen scavengers in view of the ease with which they react with molecular oxygen to form the corresponding dithiosulfate. They may also be used as antioxidants, as lubricating oil additives in view of their high concentration of sulfur in the molecule, and also as additives for gasoline, diesel and jet fuels. When diethyl dithiosulfite was dropped into fuming (97%) nitric acid, the material burst into flame. This ready inflammability permits them to be used as fuels and especially as rocket fuels. They may find other utility such as vulcanizing agents.

While the invention has been described with reference to the preparation of particular diesters of dithiosulfurous acid, other diesters may also be prepared. Di-chlorobenzyl dithiosulfite may be prepared by reacting chlorobenzyl mercaptan with thionyl chloride; di-cresyl dithiosulfite may be prepared by reacting thiocresol with thionyl chloride; dibenzyl dithiosulfite may be prepared by reacting benzyl mercaptan with thionyl chloride; di-octadecenyl dithiosulfite may be prepared by reacting octadecenyl mercaptan with thionyl chloride, diallyl dithiosulfite may be prepared by reacting allyl mercaptan with thionyl chloride, etc.

Other modifications of the present invention, besides those described herein, will be apparent from the foregoing description to those skilled in the art.

This application is a division of application S.N. 724,798, filed March 31, 1958, now U.S. Patent No. 3,015,670.

What is claimed is:
1. An insecticidal composition comprising a solution of diester of dithiosulfurous acid having the formula

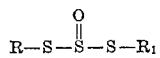

wherein R and $R_1$ are hydrocarbon radicals in an amount of from 0.001 to 1%.
2. A composition of claim 1 wherein the solvent is a ketone.
3. A composition of claim 1 wherein the solvent is an acetone.
4. A composition of claim 1 wherein the solvent is a mineral oil.
5. A composition of claim 1 wherein the solvent is a petroleum oil substantially free of aromatics.
6. As an insecticidal compsition, a solution of di-tertiary butyl dithiosulfite in amounts of between 0.001 and 1% in a petroleum oil.
7. A method for killing insects which comprises contacting insects with dihydrocarbon ester of dithiosulfurous acid in toxic quantities.
8. A method for killing insects which comprises contacting insects with a toxic quantity di-tertiary butyl dithiosulfite.

References Cited in the file of this patent

UNITED STATES PATENTS

| | | |
|---|---|---|
| 2,377,148 | Hechenbleikner | May 29, 1945 |
| 2,743,210 | Jones | Apr. 24, 1956 |